UNITED STATES PATENT OFFICE.

ZDZISLAW STANECKI, OF LEMBERG, AUSTRIA-HUNGARY.

PROCESS OF MAKING ACCUMULATOR-PLATES.

SPECIFICATION forming part of Letters Patent No. 661,085, dated November 6, 1900.

Application filed November 9, 1899. Serial No. 736,404. (No specimens.)

*To all whom it may concern:*

Be it known that I, ZDZISLAW STANECKI, a subject of the Emperor of Austria-Hungary, residing at Lemberg, in the Province of Galicia and Empire of Austria-Hungary, have invented a new and useful Improvement in Accumulator-Plates, of which the following is a specification.

My invention relates to an improvement in the manufacture of accumulator-plates, the capacity and durability of which are conditional on their porosity and hardness. In order to produce a plate having the maximum quality in this respect, I mix oxid of lead (litharge) or a mixture of oxid and peroxid of lead (commercial red lead) into a paste by the addition of distilled water. I then mold this paste into the form of a plate or slab, with or without lead supports and without the application of any considerable force. This may be done by hand or mechanism of any kind such as is commonly used for forming slabs or plates of plastic material. I then subject the plate to slow desiccation. Hydrate of lead is thereby formed on the surface of the plate as a hard crust, which prevents any further contraction or diminution of the surface thereof. As, however, the contraction continues in the interior of the plate, there are formed a larger or smaller number of pores or crevices, according to the proportion of water in the paste of which the plate has been made. By repeatedly drying and again moistening the plate with distilled water it can be hardened to the desired degree. This hardness is, moreover, relatively permanent. In order to render the plate as hard as stone, it is immersed in diluted sulfuric acid for from twelve to twenty-four hours, according to its thickness. The hardening of the plates in this solution is effected without the evolution of fumes and without effervescence or any alteration in the density of the plate.

What I claim is—

The process for the production of very hard and very porous accumulator-plates consisting in forming a paste of lead oxids with distilled water, then shaping the said paste into a slab, then slowly desiccating with repeated moistening with water, and after complete desiccation and incrustation with hydrate of lead immersing the hardened slab in dilute sulfuric acid.

In testimony whereof I have signed my name to this specification in the presence of two subscribing witnesses.

ZDZISLAW STANECKI.

Witnesses:
   WOLDEMAR HAUPT,
   HENRY HASPER.